United States Patent [19]
Graham

[11] Patent Number: 5,913,635
[45] Date of Patent: Jun. 22, 1999

[54] PIPE COUPLINGS FOR IRRIGATION SYSTEMS

[76] Inventor: Philip H. Graham, 1311 48th Ave.N.E., St. Petersburg, Fla. 33703

[21] Appl. No.: 08/944,273

[22] Filed: Oct. 6, 1997

[51] Int. Cl.$^6$ .................................................... E02B 13/00
[52] U.S. Cl. .............................. 405/43; 405/51; 239/568; 285/421
[58] Field of Search ..................... 239/550, 566, 239/560, 565, 450, 590, 193, 542, 547, 568; 138/113, 114; 285/330, 332.1, 332.4, 339, 399, 5; 405/36, 43, 45, 48, 51

[56] References Cited

U.S. PATENT DOCUMENTS

| | | | |
|---|---|---|---|
| 3,426,544 | 2/1969 | Curtis | 405/36 |
| 3,672,571 | 6/1972 | Goodmoke | 239/450 X |
| 3,753,352 | 8/1973 | McNally | 138/170 |
| 4,247,051 | 1/1981 | Allport | 239/542 |
| 4,904,112 | 2/1990 | McDonald | 405/45 |
| 5,129,758 | 7/1992 | Lindstrom | 405/48 |

FOREIGN PATENT DOCUMENTS

| | | | |
|---|---|---|---|
| 2229347 | 12/1974 | France | 239/542 |
| 2724559 | 12/1977 | Germany | 239/542 |

*Primary Examiner*—Kevin Weldon
*Attorney, Agent, or Firm*—Harold D. Shall

[57] ABSTRACT

An emitter pipe and coupling for use in an irrigation system wherein the emitter pipe includes inner and outer flexible plastic pipe with a pair of longitudinally extending spacers therebetween, the inner pipe having a plurality of longitudinally spaced openings therein confluent with a plurality of longitudinally spaced slots in the outer pipe. The end of the emitter pipe is received in a slot in the end of a rigid coupling with the inner wall of the slot having a plurality of barbs thereon engaging the interior of the pipe and the outer wall of the slot has a pressing element thereon for compressing the emitter pipe into a sealed and secure relationship with the coupling. The end of the inner wall of the coupling slot has several land areas of decreasing diameter so that by cutting off the desired land area, the volume of fluid passing through the coupling can be controlled.

2 Claims, 4 Drawing Sheets

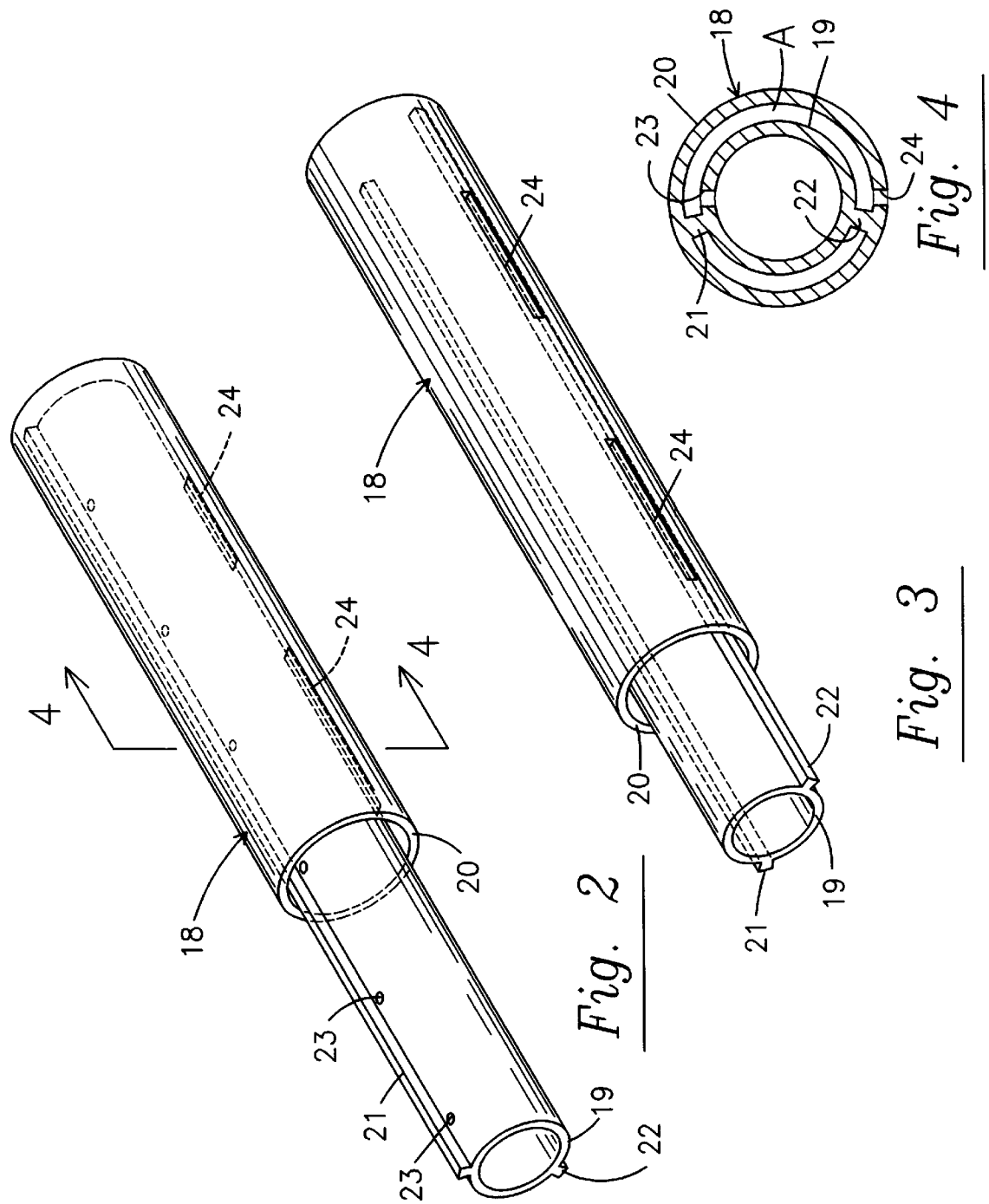

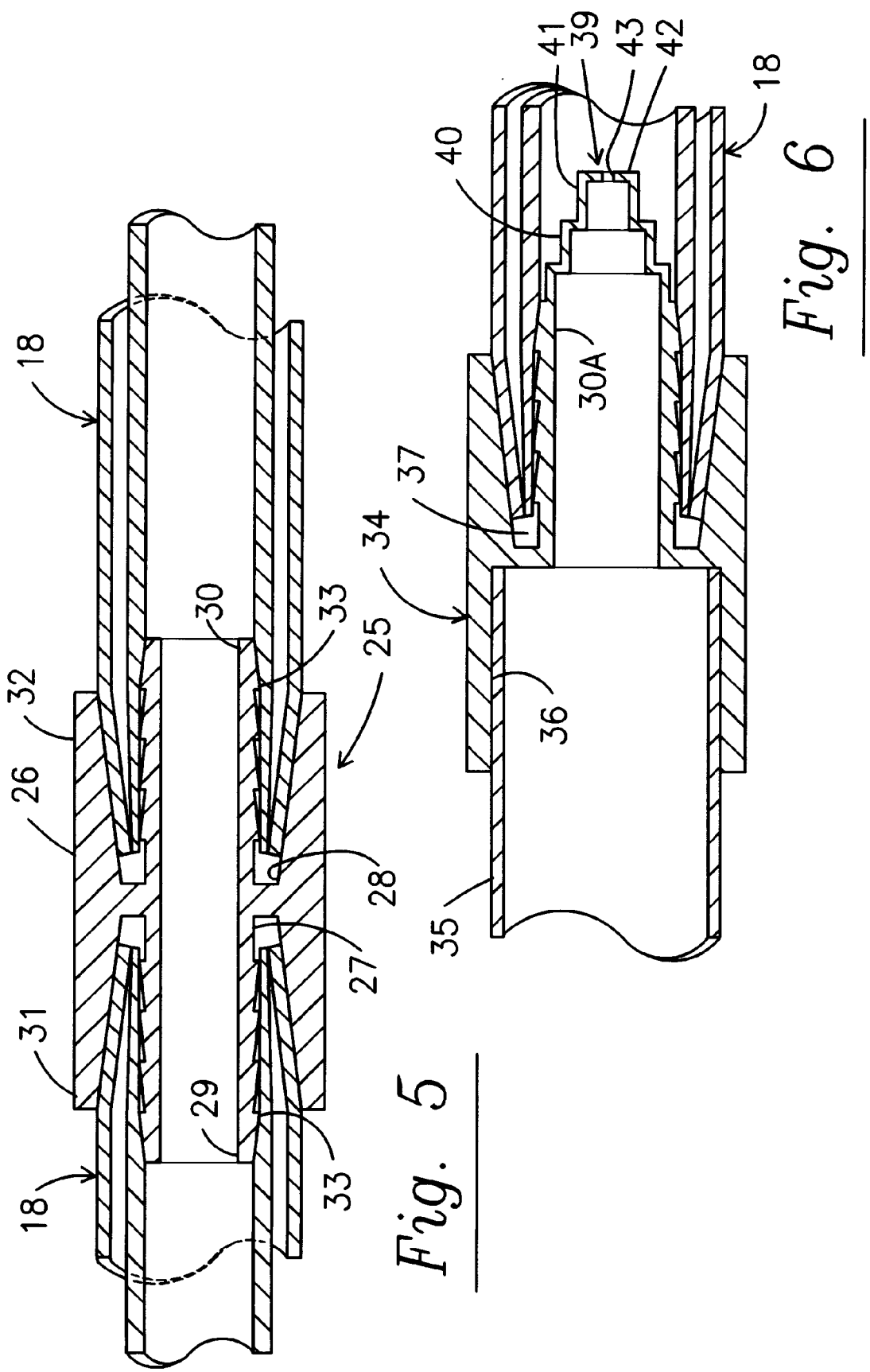

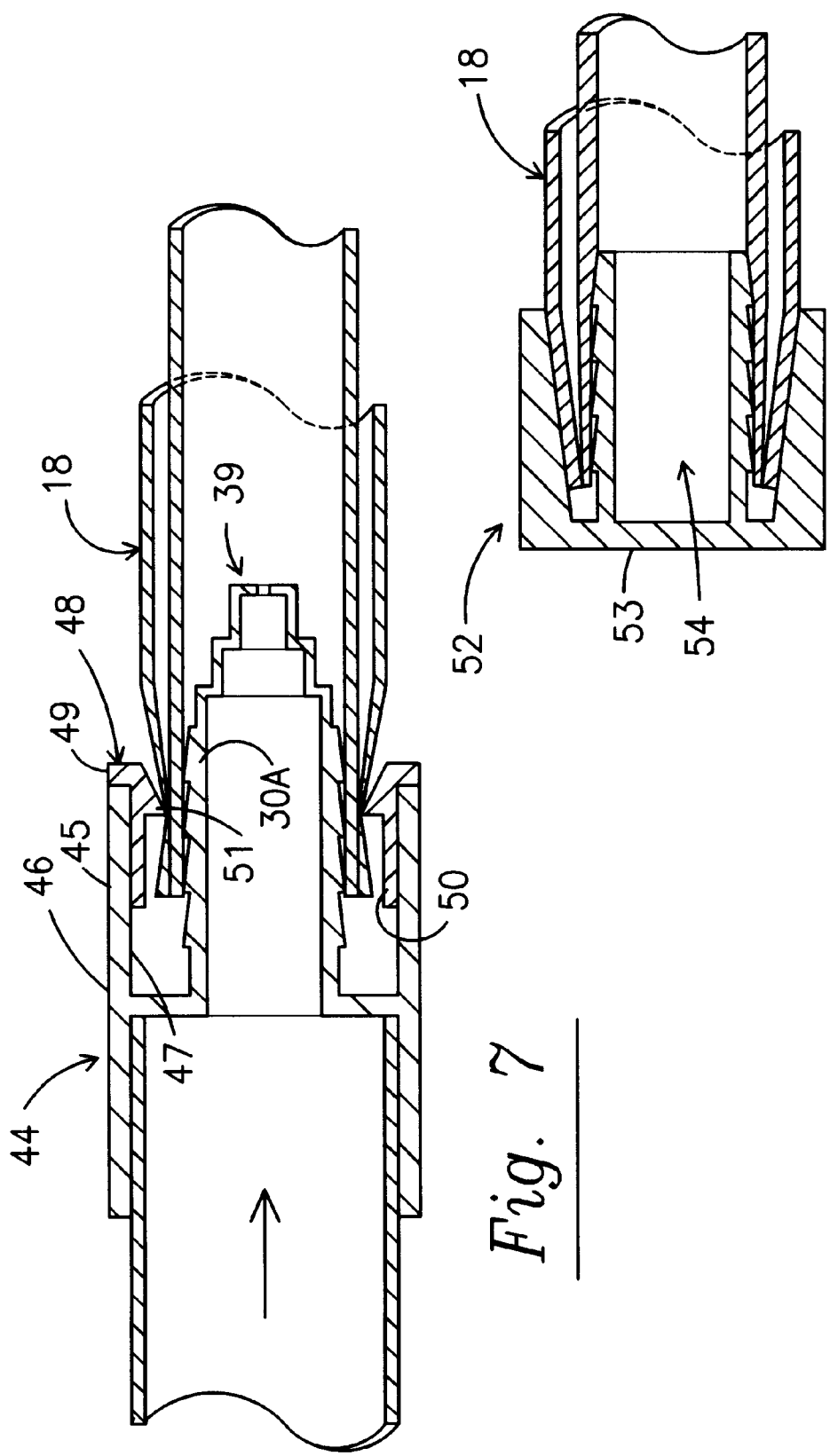

PIPE COUPLINGS FOR IRRIGATION SYSTEMS

BACKGROUND OF THE INVENTION

1. Field of the Invention

This invention relates to underground irrigation systems generally and more particularly to plastic conducting and emitter pipes and couplings therefore which couplings can include structure for flow control adjustment.

2. Description of the Prior Art

Irrigation systems designed for underground application are well known in the art as are flexible pipes and couplings therefore. Such prior art pipes are shown in U.S. Pat. Nos. 2,798,768; 3,426,544; 4,904,112 and 4,948,295 and examples of couplings are shown in U.S. Pat. Nos. 3,454,290; 4,219,222 and 4,480,856. These devices not only do not adequately prevent blockage in the flow openings in the various pipe configuration but are not adaptable to be easily fit into and secured to couplings in the field and the couplings do not include integral means for adjusting the flow of fluid therethrough.

SUMMARY OF THE INVENTION

The irrigation system of this invention uses a single unit pipe which is constructed of a pipe within a pipe and coupling fittings therefor which have integral flow control structure therein. The irrigation pipe is made of flexible pipe within a pipe structure, with the inner pipe having a plurality of spaced apertures along the top thereof leading to the space between the inner and outer pipes, and the outer pipe having a plurality of slots spaced along the bottom thereof confluent with the slots in the inner pipe and with the pipes having spacers therebetween formed integrally therewith. The coupling fitting used in conjunction with this pipe seals the pipe to the fitting so that no leakage will occur and also includes a plurality of stepped openings which can be selectively cut in the field as the pipe is installed to thereby selectively control the flow of fluid through the coupling and into the pipes.

BRIEF DESCRIPTION OF THE DRAWINGS

FIG. 2 is a perspective view of a pipe assembly according to this invention with a portion of the outer pipe omitted for clarity;

FIG. 3. is a view like FIG. 2 only rotated 90 degrees counter clockwise;

FIG. 4 is a cross sectional view taken along the line 4—4 in FIG. 2;

FIG. 5 is a longitudinal sectional view of a coupling joining two pieces of flexible pipe according to this invention;

FIGS. 6 and 7 are longitudinal sectional views of a coupling joining a piece of flexible pipe according to this invention with the coupling also being connected to a non-flexible conduit and the coupling having a stepped flow control opening therein; and FIG. 8 is a longitudinal sectional view of an end cap sealingly mounted on the end of a flexible pipe.

DETAILED DESCRIPTION OF THE PREFERRED EMBODIMENT

Figure 1:
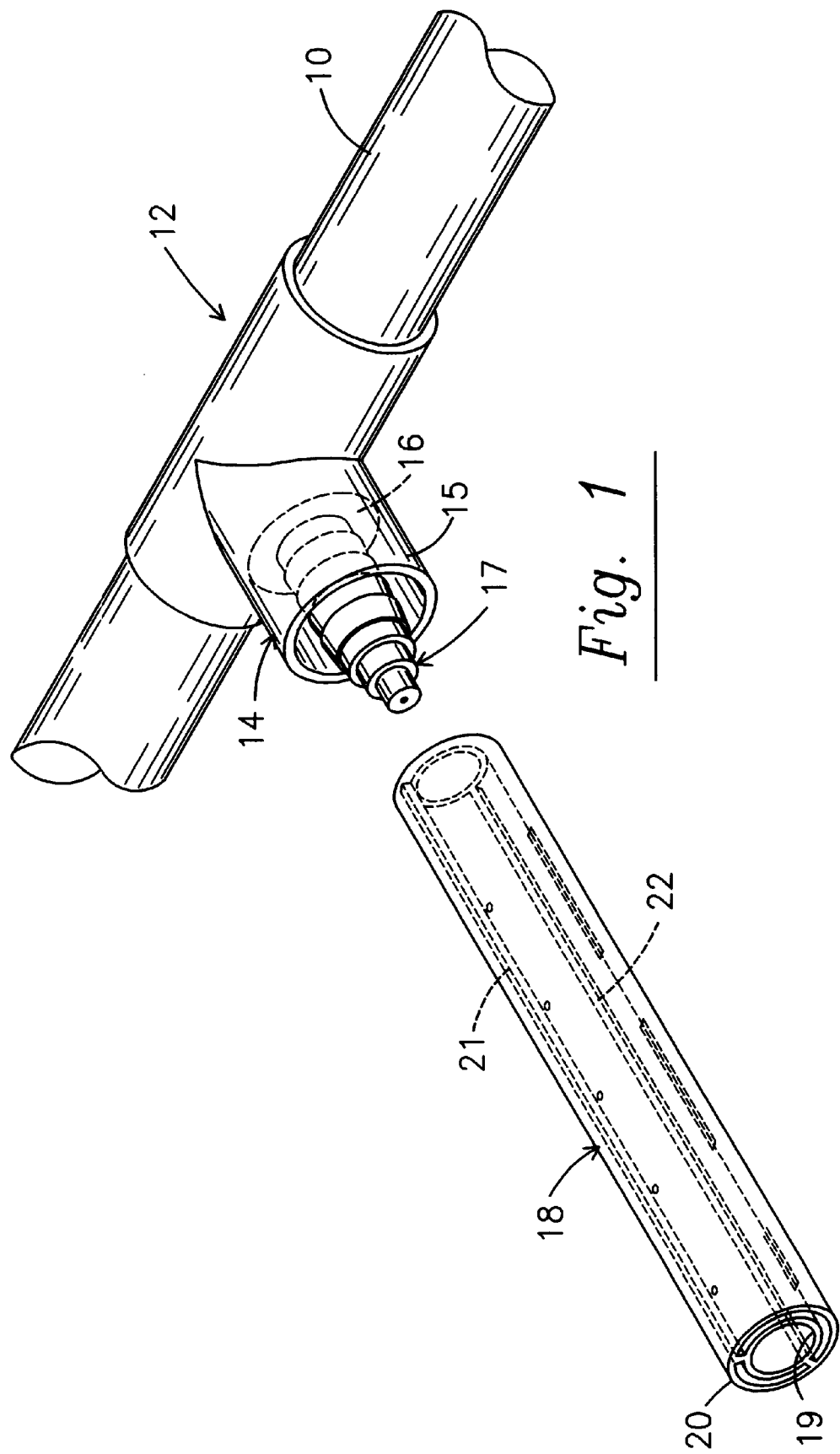
FIG. 1 is a perspective view of portion of an irrigation installation incorporating the pipe and a connector according to this invention.

Referring now to the drawings, and more particularly FIG. 1, a water supply line from a suitable source, such as a well or city water line, is shown at 10 and can be either made of rigid or flexible material, the usual material is rigid PVC pipe. The supply line 10 is connected to a fitting shown generally at 12, which is shown as being a "T" shaped fitting; however, the fitting could be straight. The fitting 12, which is also made of rigid PVC, is connected to the line 10 in the conventional way as by solvent bonding or a threaded connection.

The fitting 12 has a coupling portion, made in accordance with this invention, shown generally at 14, which portion has an outer annular sleeve 15, an inner end wall 16, a hollow annular male member 17 extending outwardly from the wall 16 and confluently connected by the coupling to the pipe 10 with the male member, the sleeve 15 and the wall 16 having the details of construction explained more thoroughly with respect to FIGS. 6, 7 and 8.

A flexible emitter pipe is shown at 18 and includes an inner pipe 19, outer pipe 20 and a pair of longitudinally extending spacers 21 and 22. The pipes 9 and 20 and the spacers 21 and 22 are all preferably made of a flexible impervious and inert-to-water material such as a plastic referred to commercially as flexible polyethylene.

The emitter pipe 18 is assembled over the end of the male member 17 of the coupling 12 and within the sleeve 15 until the end thereof approaches the end wall 16. The pipe 18 is sealingly held within the coupling 12 in a manner shown and described in more detail with respect to FIGS. 5–8.

Referring now to FIGS. 1–4 for the details of the emitter pipe 18, the emitter pipe has an inner cylindrical pipe 19 which has a plurality of longitudinally spaced apertures 23 located on the top surface thereof, and which apertures are longitudinally aligned and are preferably equally spaced to provide a uniform fluid flow from the inner pipe 19 to the space between the latter and the outer pipe 20 in the area indicated at "A", as seen in FIG. 4 to the right of the spacers 21 and 22. The emitter pipe 18 has an outer cylindrical pipe 20, preferably made of the same flexible material as the inner pipe 19 which outer pipe surrounds the inner pipe and is spaced approximately 1/16 inch therefrom by the continuous, longitudinal extending spacers 21 and 22. The spacers 21 and 22 are formed integrally with the inner and outer pipes 19 and 20 and it is contemplated that in the manufacture of the emitter pipe 18, the inner and outer pipes and the spacers will be extruded as a one piece structure. As seen in FIG. 4, the spacers are circumferentially spaced less than 180 degrees from each other with the outer pipe 20 having a plurality of longitudinally aligned and elongated slots 24 extending therethrough and spaced along the bottom thereof with the apertures 23 and the slots 24 both being confluent with the area "A" and thereby confluent with each other.

Referring now to FIG. 5, wherein two sections of emitter pipe 18 are shown connected to each other by an inline rigid coupling 25 made of rigid PVC, the coupling has a cylindrical body portion 26 into the opposed ends of which are emitter pipe receiving annular slots 27 and 28, which commence at the axial outer ends thereof and project inwardly from the axial outer ends an amount slightly more than the diameter of the emitter pipes 18, with the annular inner walls 29 and 30 of the slots 27 and 28 respectively extending axially further outwardly than the annular outer walls 31 and 32 thereof. The outer peripheral surface of the inner walls 29 and 30 have a plurality of axially spaced annular inwardly slanting angular barbs 33 formed thereon (three to four barbs have been found to be adequate). The outer annular walls 31 and 32 are slightly axially shorter than the inner walls 29 and 30, and the inner peripheral surface of the outer walls are tapered radially inwardly so that the radial width of the outer end of the slots 27 and 28 are substantially equal in size to the radial width of the wall of the emitter pipe 18 (the combined width of the wall of the pipes 19 and 20 and the space therebetween) while the axial inner end of the slots 27 and 28, have a radial width that is slightly less than the radial width of the pipes 19 and 20 with no space therebetween. By forcing the pipes 18 into the slots 27 and 28, the tapered outer walls and the barbs 33 secure the pipes in the coupling and seal the same against leakage when fluid passes therethrough.

Referring to FIG. 6 a coupling 34 is shown wherein an annular pipe 35 made of rigid PVC is solvent bonded into an annular counter bore 36 in one end of the coupling 34 and the other end of the coupling 34 has a pipe receiving slot 37, the details of construction thereof and the details of the inner and outer walls thereof are the same as the walls 30 and 32 of the coupling 25, except that the axial outer end of the inner wall of the slot 37 is modified into a pressure adjusting element shown generally at 39. The pressure adjusting element 39 is formed by a pair of annular interconnected steps 40 and 41 which are formed integrally with the axial outer end of the inner wall 30A of the coupling 34 and with the outer end of the step 41 having an end wall 42 in which is a central opening 43. The step 40 is smaller in diameter than the inner wall 30 and the step 41 is smaller than step 40. If the coupling is used as shown in FIG. 6, the opening 43 will provide the smallest flow into the pipe 18. If the outer end of the step 41 is cut off, the inner bore of the step 41 will provide the next greater volume of flow. If the outer end of step 40 is cut off, the inner bore of step 40 will provide the next greater volume of flow while if the outer end of wall 30A is cut off the largest volume of flow will be allowed through the bore of wall 30A. Such cuts can be made in the field while an irrigation system is being installed and would be predicated on the structure of the system, such as the number of and length of the emitter pipes in the system, the available fluid pressure, and the amount of flow desired in the emitter pipes.

FIG. 7 shows a modified rigid coupling 44 wherein the inner wall 30A and the pressure adjusting element 39 are the same as those shown in the coupling 34 of FIG. 6. The outer wall 45 at the right side of the coupling 44 is formed with a cylindrical outer surface 46, and a cylindrical inner surface 47. Into the axially outer end of the outer wall 45 is pressed an insert 48, which insert has a annular shoulder 49 abutting the axial outer end of the wall 45, an annular sleeve portion 50 fitting in the wall 47 and an annular inwardly projecting compressing means in the form of a barb portion 51, which engages and compresses the outer pipe 20 against the inner pipe 19 and the latter against the barbs 33 on the inner wall 30A so that the emitter pipe is sealingly and securely mounted in the coupling 44 by merely being forcefully pressed into the latter from the outer end thereof.

FIG. 8 shown a rigid end cap member 52, wherein the left end of the cap member has a solid end wall 53, completely blocking the bore 54 therein so that it is suitable to be used at the end of a run.

Although the above description relates to presently preferred embodiments, numerous changes can be made therein without departing from the scope of this invention as claimed in the following claims.

What is claimed is:

1. An emitter pipe and coupling for an irrigation system wherein, a) the emitter pipe includes inner and outer pipes made of a flexible plastic material with the inner pipe being spaced from the outer pipe and with a pair of continuous longitudinally extending spacers connecting said pipes in a spaced relationship, characterized in that said inner and outer pipes and said spacer are formed as a one piece structure, said spacers are circumferentially spaced from each other less than 180 degrees thereby providing an area of confluence in said emitter pipe extending for the full length thereof which is greater than 180 degrees in circumferential extent and said outer pipe has longitudinally extending and spaced openings in the bottom thereof confluent with said area of confluence and said inner pipe has a plurality of longitudinally spaced openings therein confluent with said area of confluence, and wherein b) the coupling is made of a rigid plastic and has a longitudinally elongated cylindrical body with a central longitudinal bore so as to form an annular open end wall, a slot formed in the end wall receiving an end of an emitter pipe with the slot defining inner and outer annular walls, characterized in that said inner wall has a plurality of pipe engaging barb means formed on the periphery thereof, and said outer wall has means thereon for compressing the end of said emitter pipe received in said slot into a sealed relationship with each other and into a sealed and secured relationship between said inner and outer walls.

2. A pipe and coupling according to claim 1 further characterized in that said coupling has a plurality of land areas extending longitudinally from said inner wall with said land areas being successively of smaller internal diameter, whereby the size of the opening through said bore can be controlled by cutting off the desired land area.

* * * * *